US011241003B2

(12) United States Patent
Li et al.

(10) Patent No.: US 11,241,003 B2
(45) Date of Patent: Feb. 8, 2022

(54) MOSQUITO-KILLING LAMP

(71) Applicant: ZHEJIANG SORBO TECHNOLOGY CO.,LTD., Wenzhou (CN)

(72) Inventors: Xuyu Li, Wenzhou (CN); Jian Zhang, Gushi (CN); Qingbao Lin, Rui'an (CN); Chaogui Li, Yongjia (CN)

( * ) Notice: Subject to any disclaimer, the term of this patent is extended or adjusted under 35 U.S.C. 154(b) by 0 days.

(21) Appl. No.: 17/211,861

(22) Filed: Mar. 25, 2021

(65) Prior Publication Data
US 2021/0315191 A1 Oct. 14, 2021

(30) Foreign Application Priority Data
Dec. 2, 2020 (CN) .......................... 202022860354.7

(51) Int. Cl.
*A01M 1/08* (2006.01)
*A01M 1/06* (2006.01)
*A01M 1/10* (2006.01)

(52) U.S. Cl.
CPC .............. *A01M 1/08* (2013.01); *A01M 1/106* (2013.01)

(58) Field of Classification Search
CPC ............. A01M 1/08; A01M 1/06; A01M 1/04
USPC ........................................... 43/139, 113, 112
See application file for complete search history.

(56) References Cited

U.S. PATENT DOCUMENTS

| 5,157,865 | A | * | 10/1992 | Chang ..................... A01M 1/08 43/113 |
| 5,915,950 | A | * | 6/1999 | Kleinhenz ........... A01M 31/002 43/139 |
| 6,568,125 | B2 | * | 5/2003 | Kleinhenz ............. A01M 1/023 43/107 |
| 7,036,269 | B1 | * | 5/2006 | Chen ....................... A01M 1/08 43/113 |
| 8,240,082 | B1 | * | 8/2012 | Fall ......................... A01M 1/08 43/139 |
| 9,049,855 | B2 | * | 6/2015 | Rocha .................. A01M 1/023 |
| 9,326,497 | B2 | * | 5/2016 | Rocha .................. A01M 1/023 |
| 10,010,065 | B2 | * | 7/2018 | Koo ...................... A01M 1/106 |
| 10,681,903 | B2 | * | 6/2020 | Eom ...................... A01M 1/08 |
| 10,701,924 | B2 | * | 7/2020 | Zheng ...................... C25B 9/17 |
| 10,905,111 | B2 | * | 2/2021 | Zhang .................... F04D 17/16 |
| 2005/0060926 | A1 | * | 3/2005 | Lee .......................... A01M 1/08 43/113 |
| 2007/0068068 | A1 | * | 3/2007 | Weiss ................... A01M 1/023 43/132.1 |

(Continued)

FOREIGN PATENT DOCUMENTS

| EP | 3354132 A4 | * | 6/2019 | ............ A01M 1/106 |
| EP | 3427581 A4 | * | 11/2019 | ................ F21V 7/22 |

(Continued)

*Primary Examiner* — Darren W Ark

(57) ABSTRACT

The present invention relates to a mosquito-killing lamp, including a shell consisting of an upper shell, a fan frame and a lower shell, wherein the upper shell is provided with a mosquito inlet cavity, the lower shell is provided with a mosquito storage cavity, the fan frame is internally provided with a mounting cavity, a mosquito blocking base is clamped between the fan frame and the lower shell, the mosquito blocking base is provided with an opening for conducting the mounting cavity and the mosquito storage cavity, the mosquito blocking base is provided with a baffle capable of opening or closing the opening in a hinge manner, and a driving mechanism is arranged on the mosquito blocking base. By adoption of the above solution, the mosquitoes are not easy to fly out and the mosquito killing effect is better.

14 Claims, 16 Drawing Sheets

(56) References Cited

U.S. PATENT DOCUMENTS

| | | | |
|---|---|---|---|
| 2008/0168702 A1* | 7/2008 | Jaffrey | A01M 1/223 43/111 |
| 2009/0038207 A1 | 2/2009 | Lin | |
| 2016/0212984 A1* | 7/2016 | Fang | A01M 1/08 |
| 2017/0273291 A1* | 9/2017 | Yoo | G16Z 99/00 |
| 2017/0290318 A1* | 10/2017 | Bergengren | A01M 1/023 |
| 2018/0288993 A1* | 10/2018 | Focks | A01M 1/06 |
| 2019/0090470 A1* | 3/2019 | Lee | A01M 1/08 |
| 2019/0133106 A1* | 5/2019 | Eom | A01M 1/10 |
| 2019/0159441 A1 | 5/2019 | Zheng | |
| 2020/0344992 A1* | 11/2020 | Kaye | A01M 1/023 |

FOREIGN PATENT DOCUMENTS

| | | | | |
|---|---|---|---|---|
| GB | 424235 A * | 2/1935 | | A01M 1/08 |
| JP | H0633472 U * | 5/1994 | | |
| JP | 3136423 U * | 10/2007 | | |
| JP | 2010022754 A * | 2/2010 | | |
| JP | 5117922 B2 * | 1/2013 | | |
| KR | 100753435 B1 * | 8/2007 | | |
| KR | 100791645 B1 * | 1/2008 | | |
| KR | 100808678 B1 * | 2/2008 | | |
| KR | 20090009373 A * | 1/2009 | | |
| KR | 20090005532 U * | 6/2009 | | |
| KR | 20110038890 A * | 4/2011 | | |
| KR | 20120017302 A * | 2/2012 | | |
| KR | 101241826 B1 * | 3/2013 | | |
| KR | 20150073547 A * | 7/2015 | | |
| WO | WO-2008010232 A1 * | 1/2008 | | A01M 1/08 |
| WO | WO-2008052217 A2 * | 5/2008 | | A01M 1/08 |
| WO | WO-2018182265 A1 * | 10/2018 | | F21V 33/00 |
| WO | WO-2018236175 A1 * | 12/2018 | | A01M 1/08 |
| WO | WO-2019135564 A1 * | 7/2019 | | A01M 1/08 |
| WO | WO-2020125688 A1 * | 6/2020 | | A01M 1/08 |

* cited by examiner

MOSQUITO-KILLING LAMP

TECHNICAL FIELD

The utility model relates to the technical field of a mosquito-killing device, and in particular, to a mosquito-killing lamp.

BACKGROUND

There are various mosquitoes in public places or at home, and the mosquitoes will affect the normal rest of people and carry germs, so it is necessary to kill the mosquitoes.

The general mosquito-killing lamp includes a shell, wherein the shell includes an upper shell, a fan frame and a lower shell which are arranged sequentially from top to bottom, the upper shell and the lower shell are connected through the fan frame, the upper shell is provided with a mosquito inlet cavity, the lower shell is provided with a mosquito storage cavity, a mounting cavity for communicating the mosquito inlet cavity and the mosquito storage cavity is formed in the fan frame, a fan is mounted at the mounting cavity, the upper shell is provided with an air inlet for mosquitoes to fly into the mosquito inlet cavity, the lower shell is provided with an air outlet communicating with the mosquito inlet cavity, the air inlet, the mosquito inlet cavity, the mounting cavity, the mosquito storage cavity and the air outlet form a complete wind path, the shell is internally provided with a mosquito-luring lamp, and when the fan works, negative pressure is generated at the air inlet, and the mosquitoes fly into the air inlet and are absorbed in the mosquito inlet cavity and then are driven to the mosquito storage cavity by air flow. However, in these mosquito-killing lamps, when the fan stops working, since the upper end of the mosquito storage cavity is open, the mosquitoes will fly out of the air inlet of the upper shell, and the mosquito-killing effect is not good.

SUMMARY

The utility model overcomes the defects of the prior art and provides a mosquito-killing lamp with a mosquito-killing function. The mosquito is not easy to fly out and the mosquito-killing effect is more excellent.

To achieve the above objective, the technical solution adopted by the utility model is: a mosquito-killing lamp includes a shell, wherein the shell includes an upper shell, a fan frame and a lower shell which are arranged sequentially from top to bottom, the upper shell and the lower shell are connected through the fan frame, the upper shell is provided with a mosquito inlet cavity, the lower shell is provided with a mosquito storage cavity, the fan frame is internally provided with a mounting cavity for communicating the mosquito inlet cavity and the mosquito storage cavity, a fan is mounted at the mounting cavity, the upper shell is provided with an air inlet for mosquitoes to fly into the mosquito inlet cavity, the lower shell is provided with an air outlet communicating with the mosquito storage cavity, the air inlet, the mosquito inlet cavity, the mounting cavity, the mosquito storage cavity and the air outlet form a complete wind path, the shell is internally provided with a mosquito-luring lamp, a mosquito blocking base is clamped between the fan frame and the lower shell, the mosquito blocking base is provided with an opening for conducting the mounting cavity and the mosquito storage cavity, the mosquito blocking base is provided with a baffle capable of opening or closing the opening in a hinge manner, a driving mechanism for driving the baffle to swing is arranged on the mosquito blocking base, the driving mechanism includes a motor device, a drive gear, a connecting rod and a movable piece, the motor device is fixedly arranged on the mosquito blocking base, the drive gear is rotatably arranged on the mosquito blocking base, the movable piece is slidingly arranged on the mosquito blocking base along a vertical direction, the movable piece is provided with a rack occluded with the drive gear in a linkage manner along the vertical direction, one end of the connecting rod is arranged on the movable piece in a hinge manner and the other end of the connecting rod is arranged on the baffle in a hinge manner, an output shaft of the motor device drives the drive gear to rotate, the drive gear drives the movable piece to move up and down, and the movable piece drives the baffle to swing through the connecting piece.

By the above solution, the fan is a conventional technology in the field, so the fan will not be described in detail in the description. When the fan is electrified, the movable piece may be driven by the motor device to move, the movable piece drives the baffle to swing through the connecting rod to open the opening so as to conduct the mounting cavity and the mosquito storage cavity, the fan can drive air in the shell to flow, the air may enter the mosquito inlet cavity from the air inlet, then passes through the mounting cavity and the mosquito storage cavity and finally flows out of the air outlet. When flying into the air inlet, mosquitoes are absorbed into the mosquito inlet cavity and then are driven by the air flow to the mosquito storage cavity, and the mosquitoes cannot fly out of the air outlet. As long as the fan works all the time, the mosquitoes stay in the mosquito storage cavity all the time under the drive of the fan. When the fan stops working, the movable piece may be driven by the motor device to move, and the movable piece drives the baffle to swing through the connecting rod to close the opening, such that the mounting cavity and the mosquito storage cavity are cut off, the mosquitoes are closed in the mosquito storage cavity until death. Since the fan is arranged in the mounting cavity, fingers are not easy to extend into the mounting cavity, use is facilitated, and the mosquito-luring lamp can attract and lure the mosquitoes to approach the air inlet, such that the mosquito-killing effect is more excellent.

The utility model is further set as: a cross beam is arranged in the middle of the mosquito blocking base, the motor device, the drive gear and the movable piece are arranged on the cross beam, the opening includes a first opening and a second opening which are located on two sides of the cross beam, the baffle is provided with a first baffle and a second baffle respectively at the positions corresponding to the first opening and the second opening, the first baffle and the second baffle are arranged on the cross beam respectively in a hinge manner, and the movable piece moves to simultaneously drive the first baffle and the second baffle to swing.

By the above solution, the mosquito blocking base is reasonable in structural design, thus facilitating mounting of the driving mechanism, the first baffle and the second baffle and making full use of the mounting space.

The utility model is further set as: the connecting rod includes a first connecting rod and a second connecting rod, the movable piece is provided with a first hinge base and a second hinge base respectively on two sides corresponding to the first baffle and the second baffle, the first baffle is provided with a third hinge base at a position close to the movable piece, the second baffle is provided with a fourth hinge base at a position close to the movable piece, the third hinge base is located above the first hinge base, the fourth hinge base is located above the second hinge base, one end of the first connecting rod is arranged on the first hinge base in a hinge manner and the other end of the first connecting rod is arranged on the third hinge base in a hinge manner, and one end of the second connecting rod is arranged on the second hinge base in a hinge manner and the other end of the second connecting rod is arranged on the fourth hinge base in a hinge manner.

By the above solution, the movable piece moves upward to simultaneously drive the first baffle and the second baffle to swing downward so as to open the first opening and the second opening; the movable piece moves downward to simultaneously drive the first baffle and the second baffle to swing upward so as to close the first opening and the second opening; a connecting head is arranged on an end part of the connecting rod, and the connecting head includes two symmetrically arranged elastic blocks, the hinge base is provided with a through hole; and when the elastic blocks penetrate through the through hole, the elastic blocks cannot be separated from the through hole and will not affect the movement of the connecting rod, the structure is simple and the position design is reasonable.

The utility model is further set as: the cross beam is provided with a movable cavity for the movable piece to move, a guide groove is formed in a side wall of the movable cavity along the vertical direction, and the movable piece is provided with a guide block in s sliding fit with the guide groove.

By the above solution, the movable piece moves more stably, the structure is simple, mounting is convenient, and design is reasonable.

The utility model is further set as: a driving gear is arranged on the output shaft of the motor device, the drive gear is rotatably arranged on the mosquito blocking base through a rotating shaft, a first transmission gear engaged with the driving gear is rotatably arranged on the rotating shaft, the mosquito blocking base is provided with a second transmission gear engaged with the first transmission gear beside the first transmission gear, and the second transmission gear is engaged with the drive gear.

By the above solution, the first transmission gear and the drive gear do not interfere with each other, and the first transmission gear and the second transmission gear play a role in deceleration; moreover, the position design is reasonable, the mounting space is fully utilized, and transmission stability is achieved.

The utility model is further set as: the upper shell includes a middle frame and an upper cover, the upper cover covers the middle frame and is fixedly connected to the middle frame, the middle frame is fixedly connected to the fan frame, the air inlet is formed in an outer side surface of the middle frame, the mosquito inlet cavity is formed in the middle frame, a light guide sleeve is fixedly arranged on the upper cover, the guide sleeve extends into the mosquito inlet cavity, the mosquito-luring lamp is arranged on an end part of the light guide sleeve, a circuit board, a battery and a button switch are arranged on the upper cover, the motor device, the battery, the fan, the mosquito-luring lamp and the button switch are connected to the circuit board respectively, a tube is fixedly arranged on the upper cover, and the tube conducts the upper cover and the mounting cavity.

By the above solution, the button switch includes a mosquito-killing switch for controlling operation of the fan and the motor, and a lamp switch for turning on the mosquito-luring lamp. After the mosquito-killing lamp is turned on, light may be conducted through the light guide sleeve to achieve a better mosquito-luring effect, a lead may be conveyed through the tube, and the setting is more reasonable.

The utility model is further set as: an annular mosquito-preventing net is fixedly connected blow the mosquito blocking base, the lower shell is in a clamping fit with the mosquito blocking base, a periphery of the annular mosquito-preventing net is surrounded by a side wall of the lower shell, and the air outlet includes a first air outlet formed in the side wall of the lower shell and a second air outlet formed in a bottom surface of the lower shell.

By the above solution, the arrangement of the annular mosquito-preventing net will not allow the mosquitoes to fly out of the first air outlet of the lower shell; the second air outlet is small, so the mosquitoes are not easy to fly out; the first air outlet and the second air outlet may enhance ventilation; the mosquito blocking base is provided with a clamping block, the lower shell is provided with a clamping groove, and the clamping block is clamped into the clamping groove to realize fixed connection of the mosquito blocking base and the lower shell. The structure is simple and the design is reasonable.

The utility model is further described with reference to the accompanying drawings.

DESCRIPTION OF THE EMBODIMENTS

Figure 1:
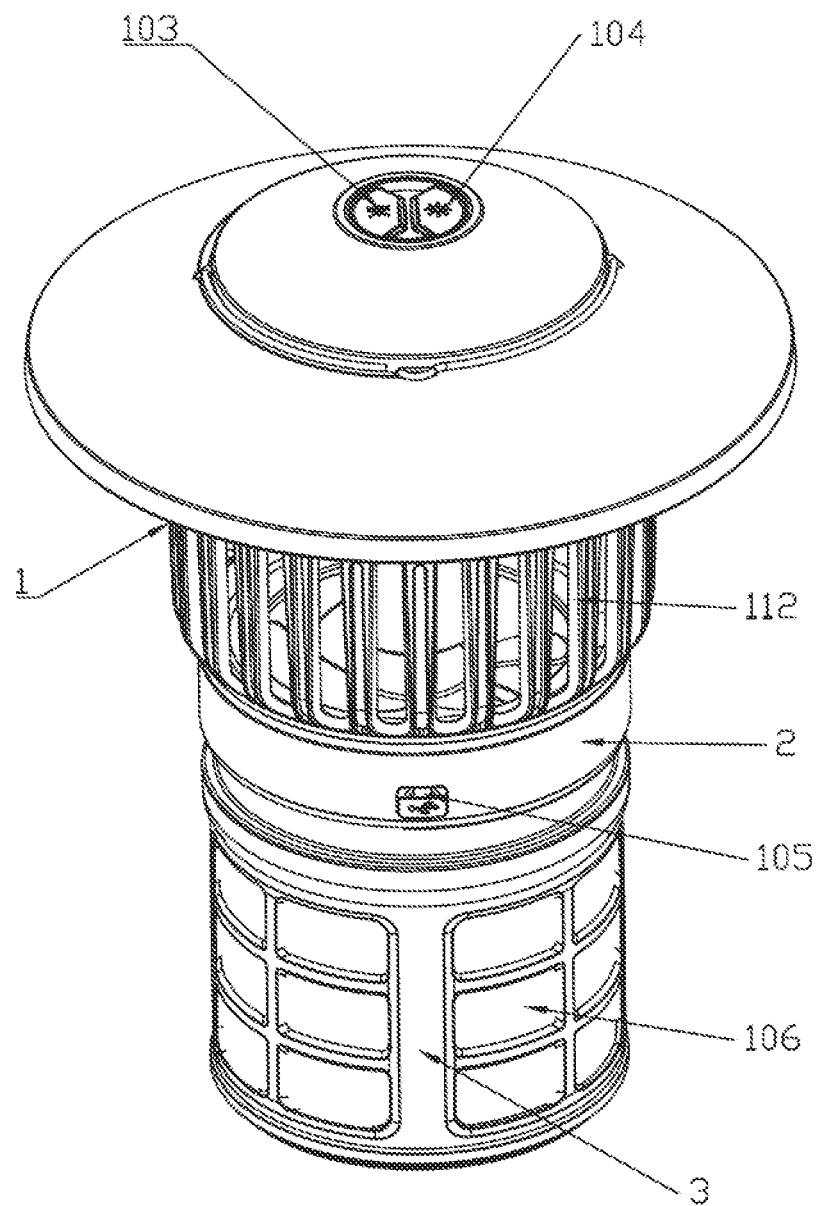
FIG. 1 is a schematic diagram of an overall structure according to an embodiment of the utility model.
Figure 2:
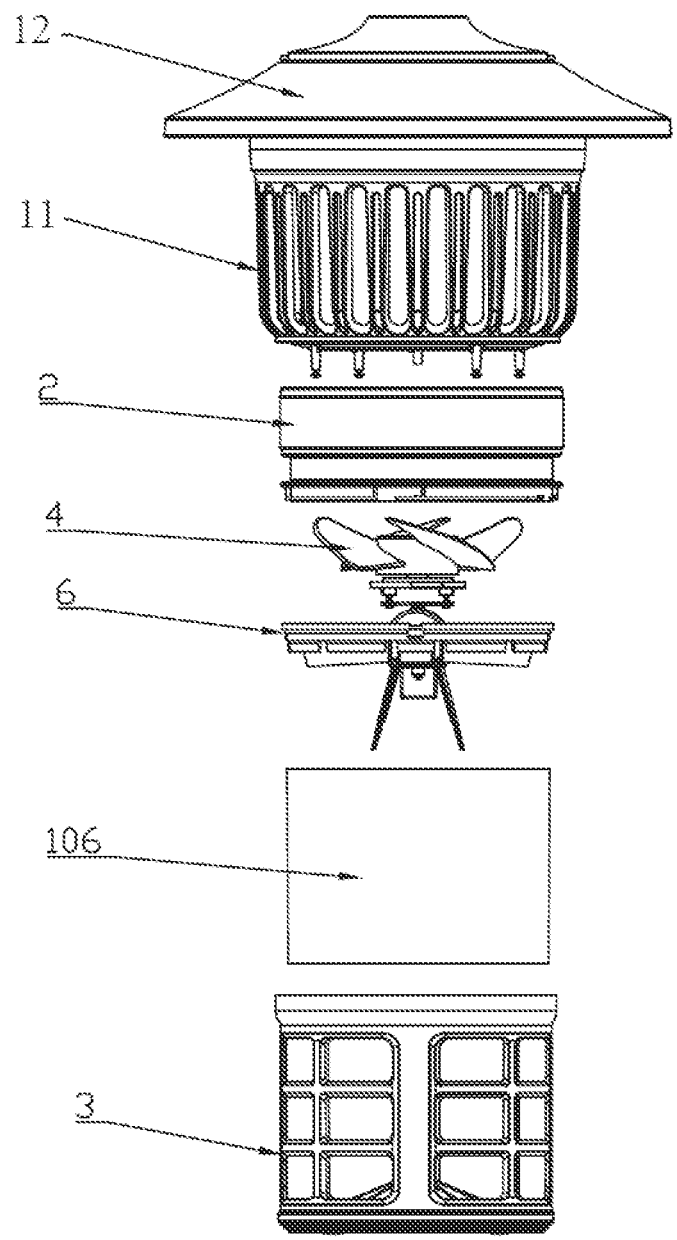
FIG. 2 is a schematic diagram of an exploded structure of FIG. 1.
Figure 3:
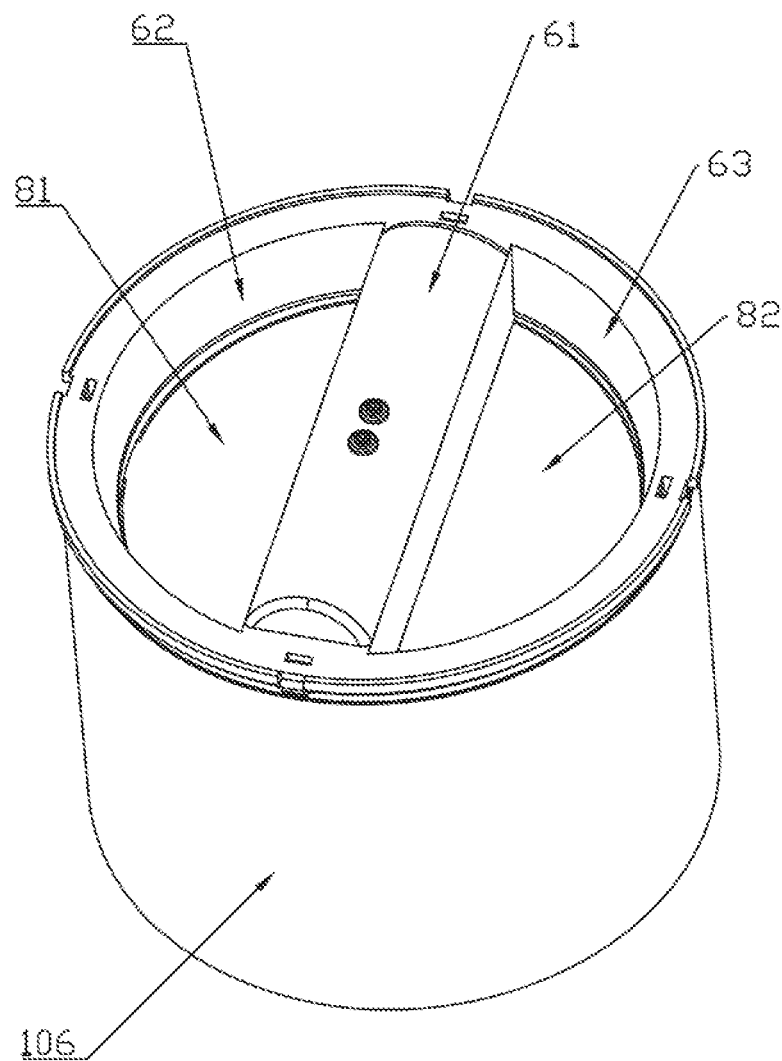
FIG. 3 is a schematic diagram of a cut-off state of a mosquito inlet cavity and a mosquito storage cavity.
Figure 4:
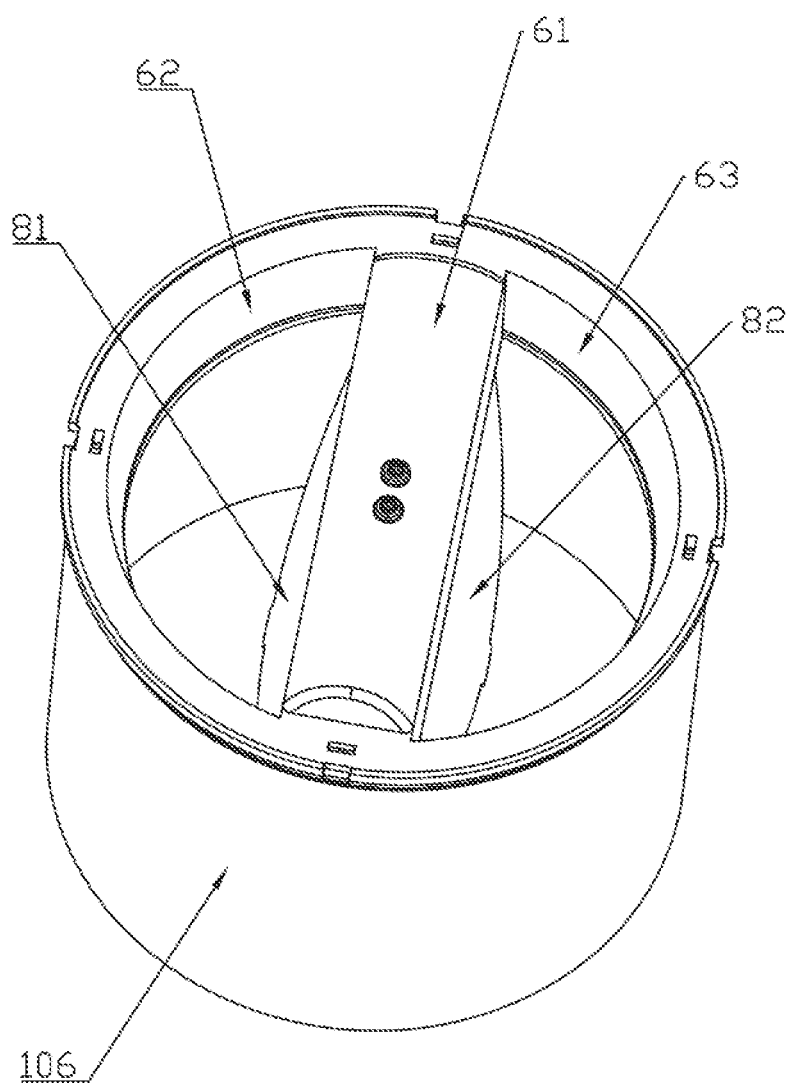
FIG. 4 is a schematic diagram of a conduction state of a mosquito inlet cavity and a mosquito storage cavity.
Figure 5:
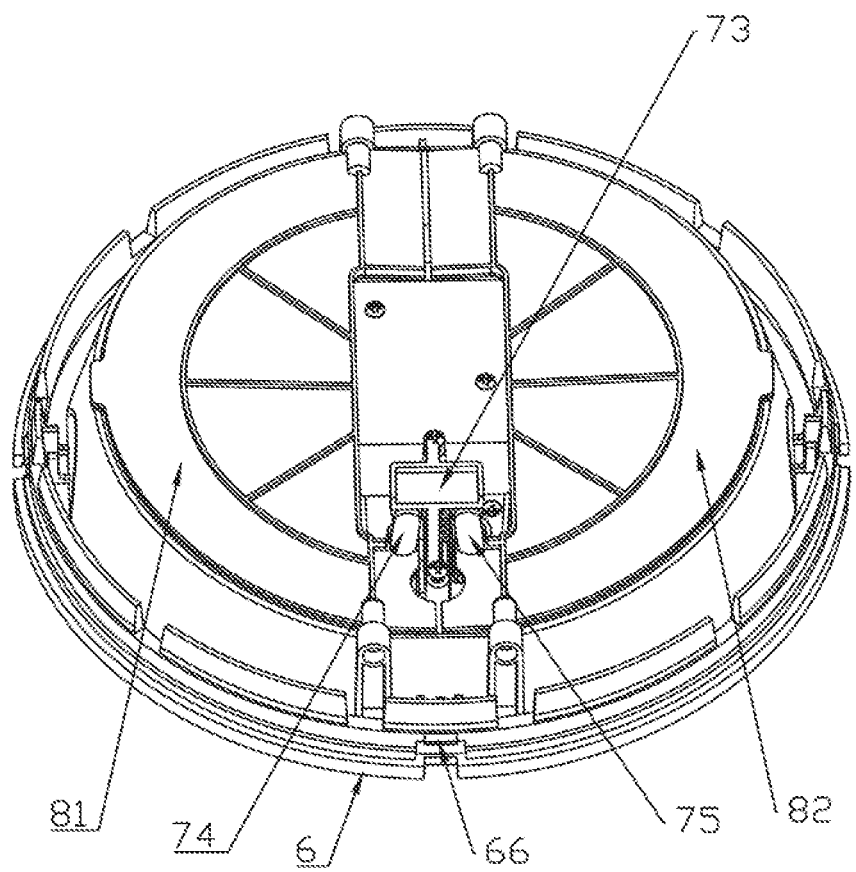
FIG. 5 is a schematic diagram of a cooperation structure of a driving mechanism, a first baffle and a second baffle.
Figure 6:
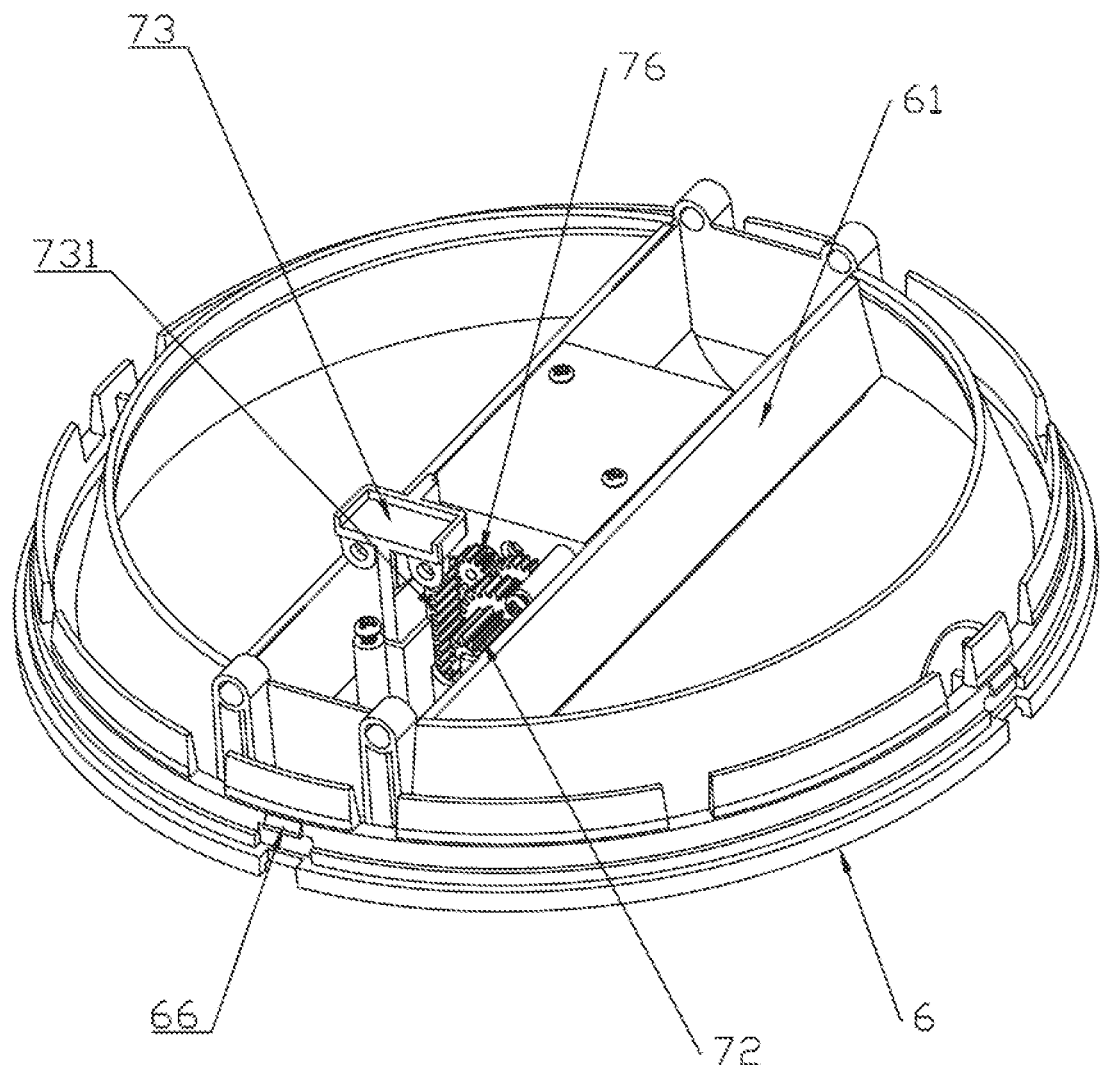
FIG. 6 is a schematic diagram of a cooperation structure of a movable piece and a mosquito blocking base.
Figure 7:
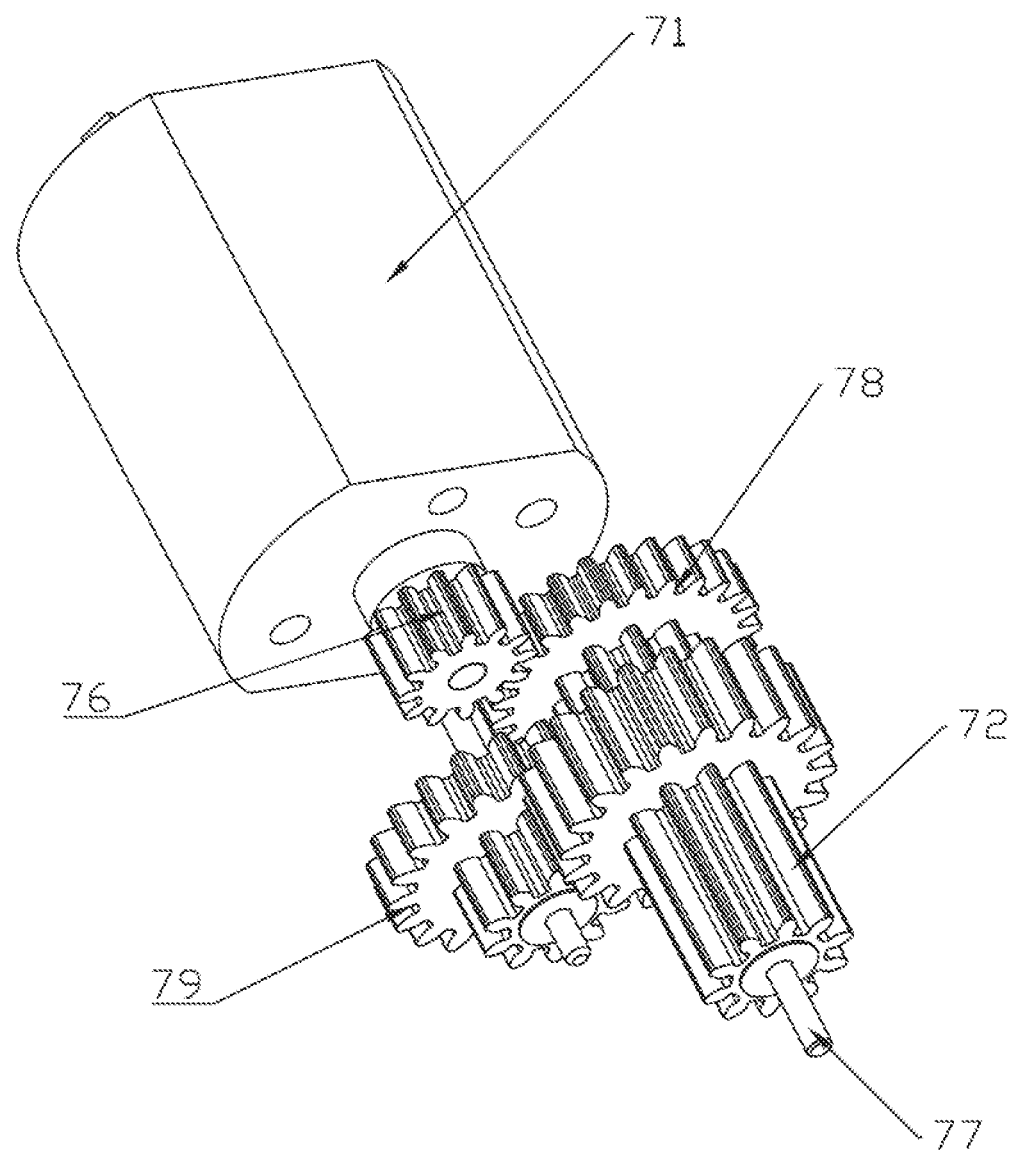
FIG. 7 is a schematic diagram of a cooperation structure of a motor device and a drive gear.
Figure 8:
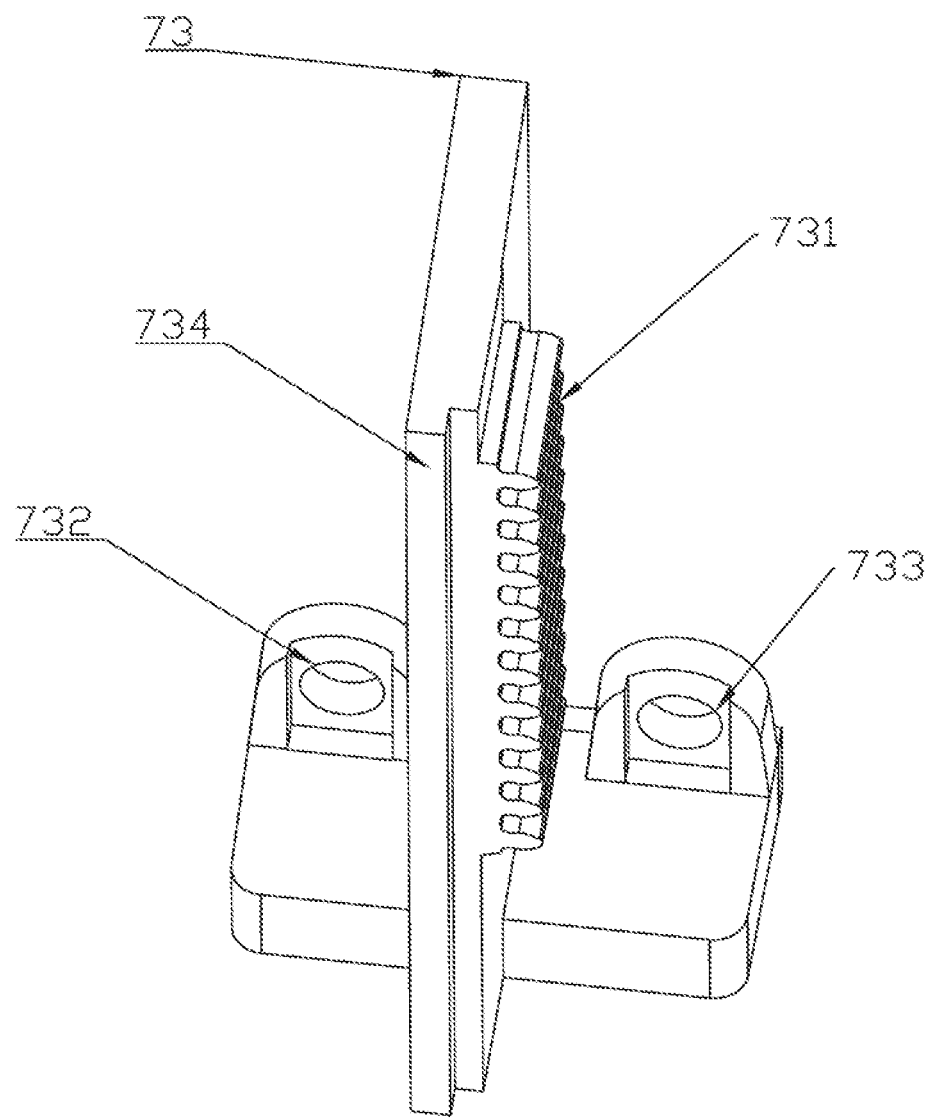
FIG. 8 is a structural schematic diagram of a movable piece.
Figure 9:
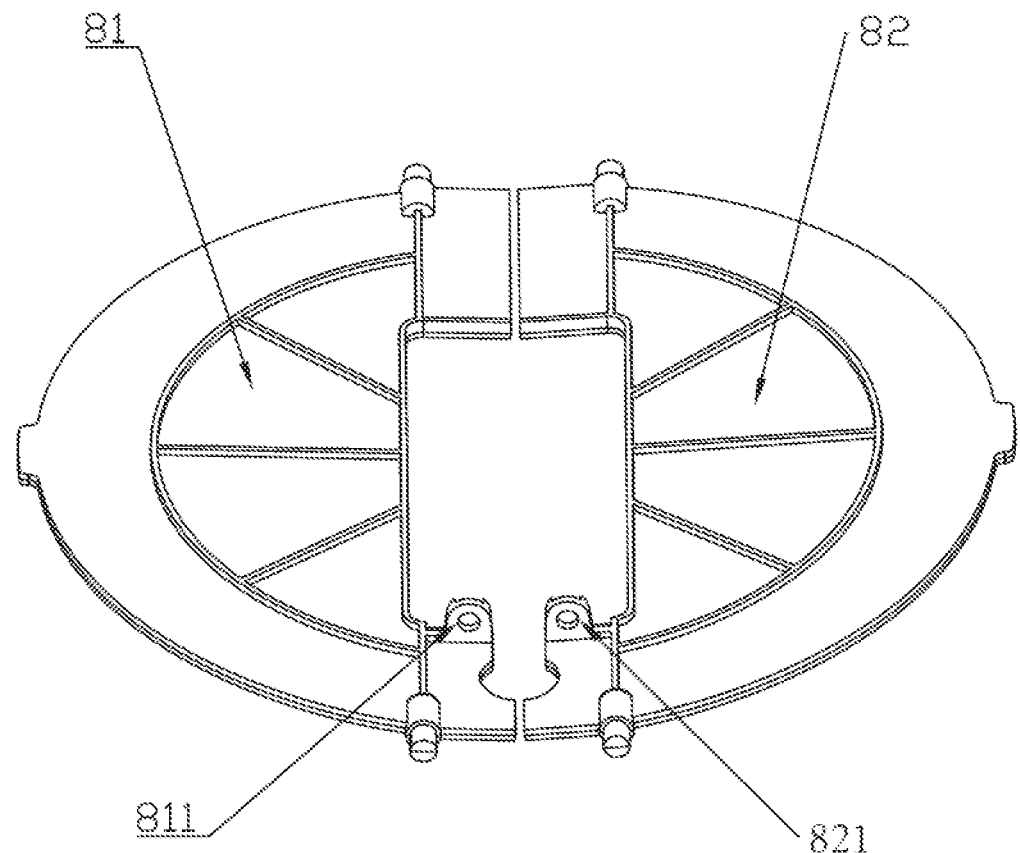
FIG. 9 is a structural schematic diagram of a first baffle and a second baffle.
Figure 10:
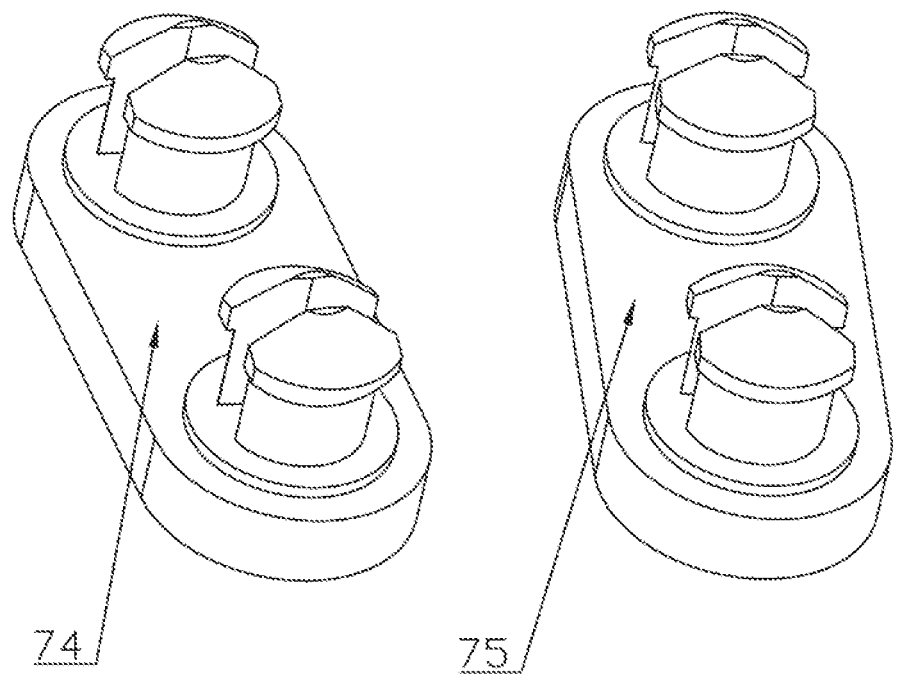
FIG. 10 is a structural schematic diagram of a first connecting rod and a second connecting rod.
Figure 11:
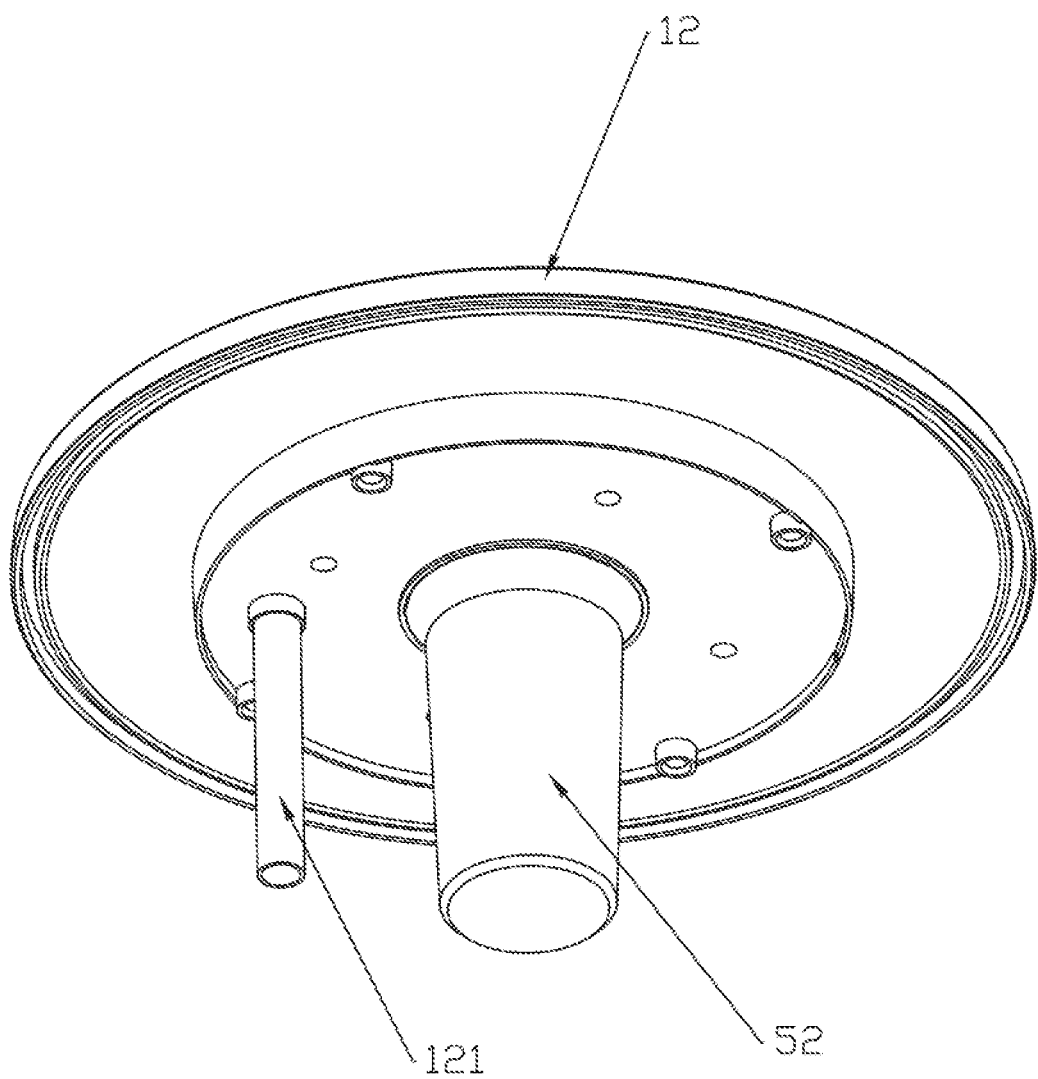
FIG. 11 is a schematic diagram of a cooperation structure of an upper cover and a light guide sleeve.
Figure 12:
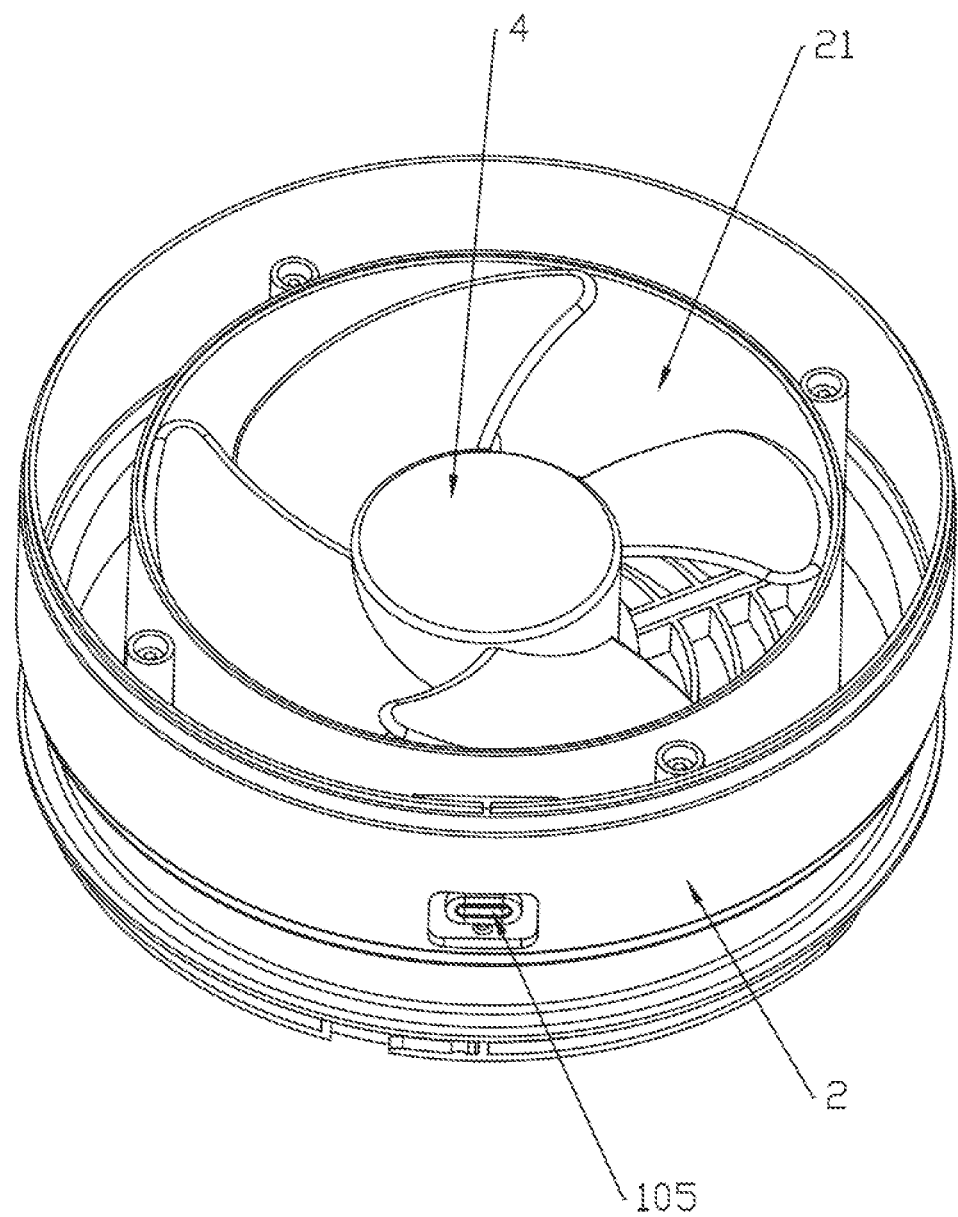
FIG. 12 is a schematic diagram of a mounting structure of a fan.
Figure 13:
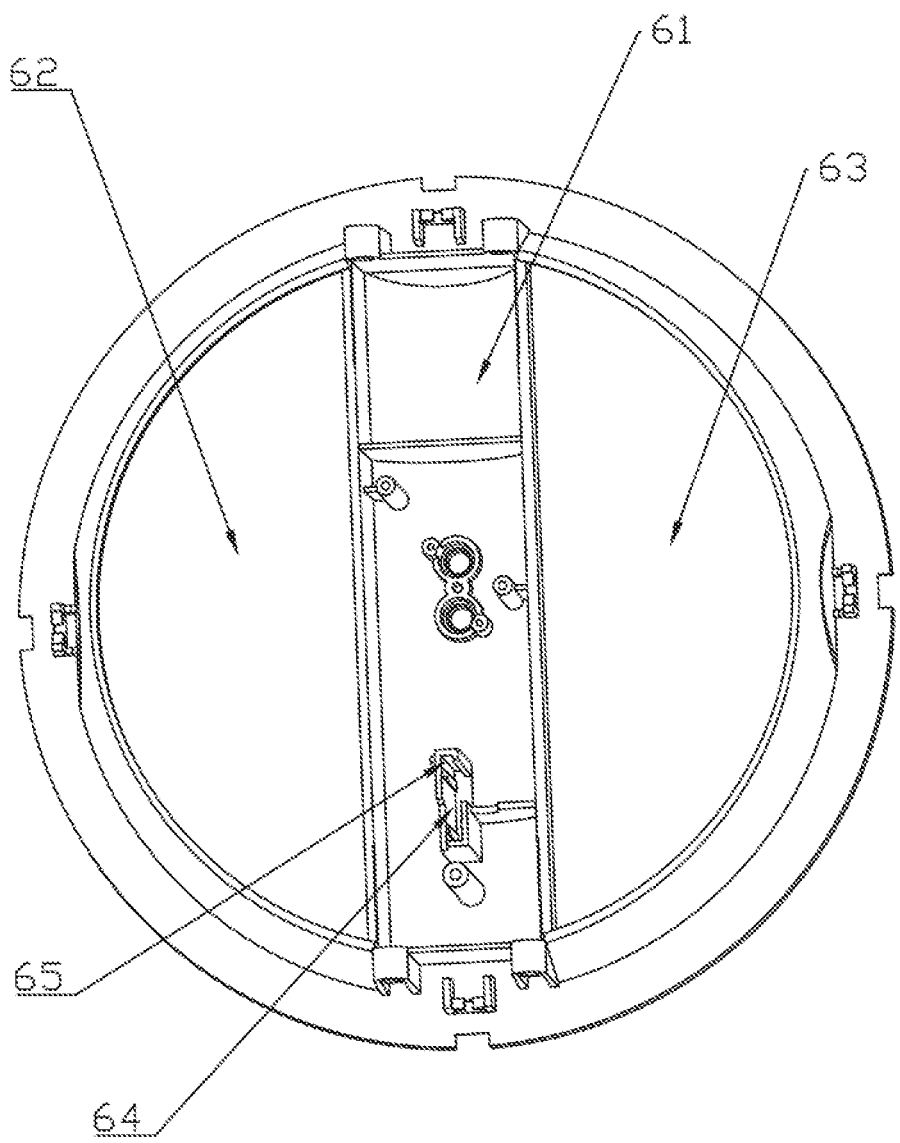
FIG. 13 is a structural schematic diagram of a cross beam.
Figure 14:
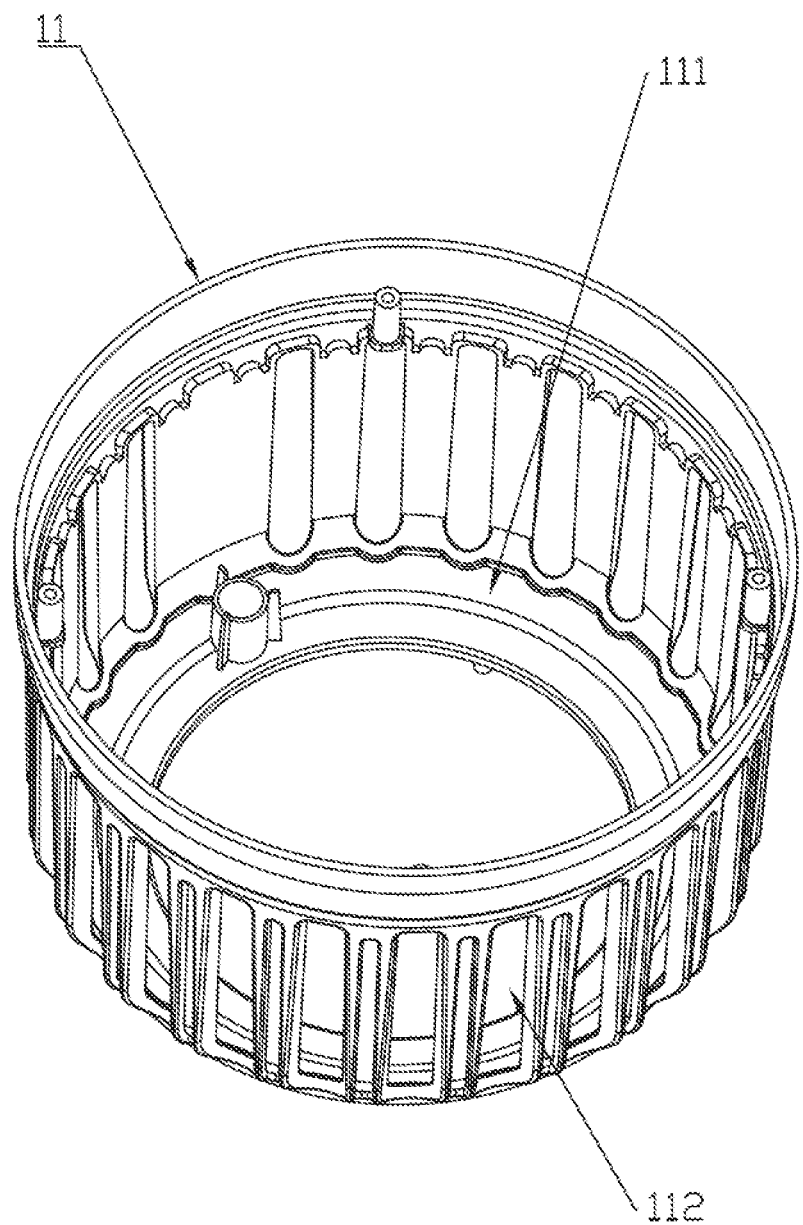
FIG. 14 is a structural schematic diagram of a middle frame.
Figure 15:
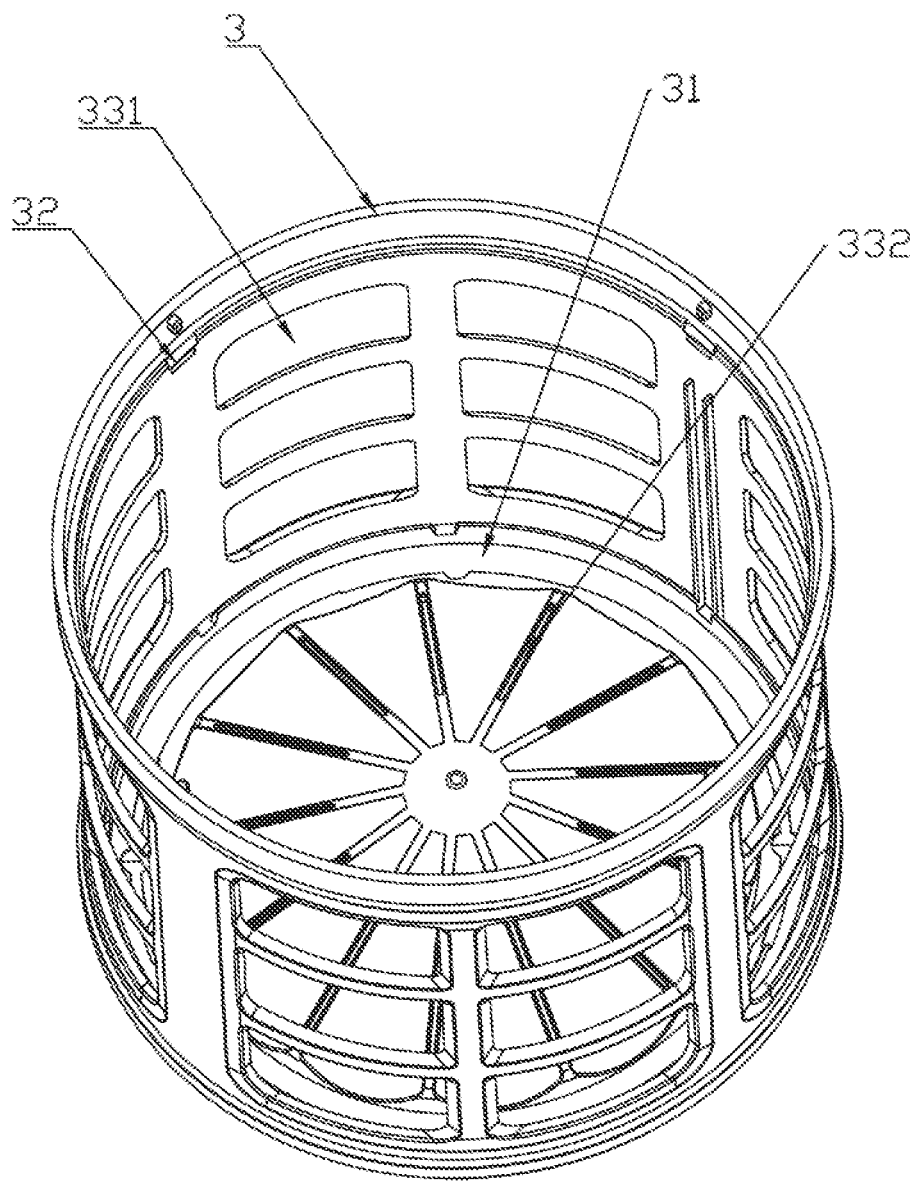
FIG. 15 is a structural schematic diagram of a lower shell.
Figure 16:
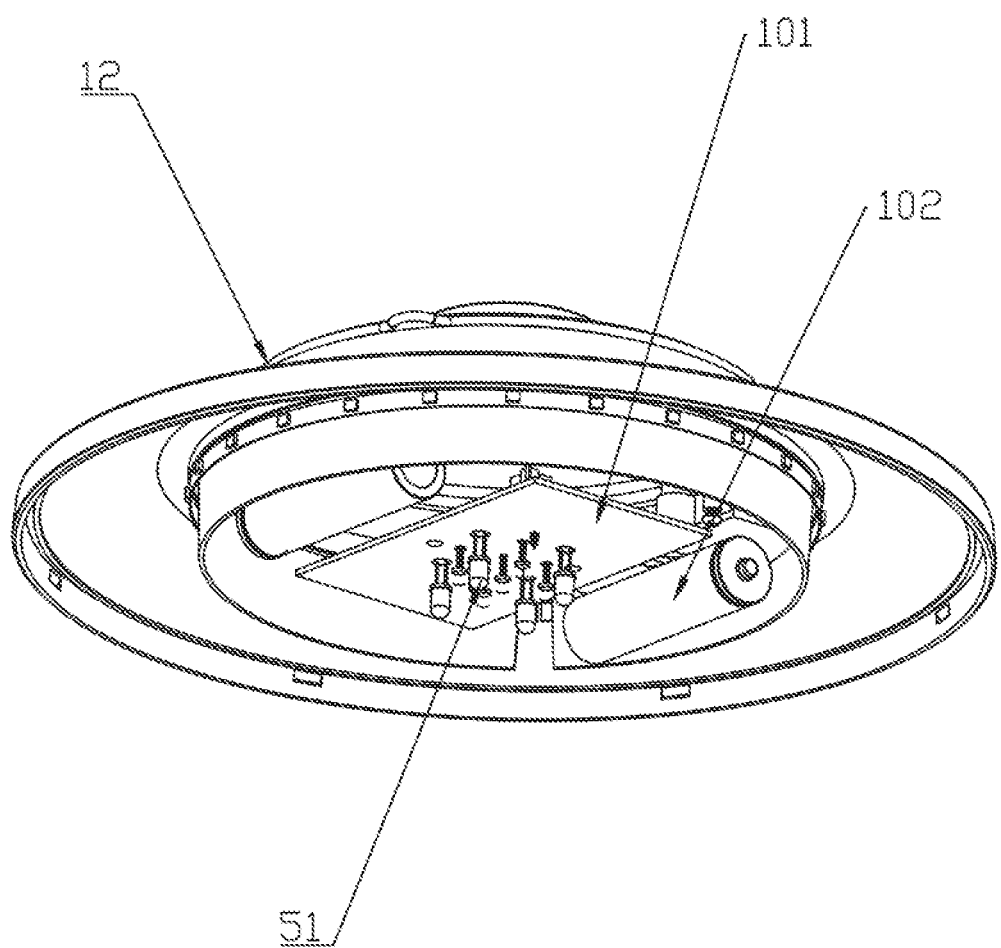
FIG. 16 is a schematic diagram of an internal structure of an upper cover.

As shown in FIG. 1 to FIG. 16, a mosquito-killing lamp includes a shell, wherein the shell includes an upper shell 1, a fan frame 2 and a lower shell 3 which are arranged sequentially from top to bottom, the upper shell 1 and the lower shell 3 are connected through the fan frame 2, the upper shell 1 is provided with a mosquito inlet cavity 111, the lower shell 3 is provided with a mosquito storage cavity 31, the fan frame 2 is internally provided with a mounting cavity 21 for communicating the mosquito inlet cavity 111 and the mosquito storage cavity 31, a fan 4 is mounted at the mounting cavity 21, the upper shell 1 is provided with an air inlet 112 for mosquitoes to fly into the mosquito inlet cavity 111, the lower shell 3 is provided with an air outlet communicating with the mosquito storage cavity 31, the air inlet 112, the mosquito inlet cavity 111, the mounting cavity 21, the mosquito storage cavity 31 and the air outlet form a complete wind path, the shell is internally provided with a mosquito-luring lamp 51, a mosquito blocking base 6 is clamped between the fan frame 2 and the lower shell 3, the mosquito blocking base 6 is provided with an opening for conducting the mounting cavity 21 and the mosquito storage cavity 31, the mosquito blocking base 6 is provided with a baffle capable of opening or closing the opening in a hinge manner, a driving mechanism for driving the baffle to swing is arranged on the mosquito blocking base 6, the driving mechanism comprises a motor device 71, a drive gear 72, a connecting rod and a movable piece 73, the motor device 71 is fixedly arranged on the mosquito blocking base 6, the drive gear 72 is rotatably arranged on the mosquito blocking base 6, the movable piece 73 is slidingly arranged on the mosquito blocking base 6 along a vertical direction, the movable piece 73 is provided with a rack 731 occluded with the drive gear 72 in a linkage manner along the vertical direction, one end of the connecting rod is arranged on the movable piece 73 in a hinge manner and the other end of the connecting rod is arranged on the baffle in a hinge manner, an output shaft of the motor device 71 drives the drive gear 72 to rotate, the drive gear 72 drives the movable piece 73 to move up and down, and the movable piece 73 drives the baffle to swing through the connecting piece.

In this embodiment, a cross beam 61 is arranged in the middle of the mosquito blocking base 6, the motor device 71, the drive gear 72 and the movable piece 73 are arranged on the cross beam 61, the opening includes a first opening 62 and a second opening 63 which are located on two sides of the cross beam, the baffle is provided with a first baffle 81 and a second baffle 82 respectively at the positions corresponding to the first opening 62 and the second opening 63, the first baffle 81 and the second baffle 82 are arranged in a semi-disk shape, the first baffle 81 and the second baffle 82 are arranged on the cross beam 61 respectively in a hinge manner, and the movable piece 73 moves to simultaneously drive the first baffle 81 and the second baffle 82 to swing. Of course, one opening may be provided and is opened or closed by one baffle.

In this embodiment, the connecting rod includes a first connecting rod 74 and a second connecting rod 75, the movable piece 73 is provided with a first hinge base 732 and a second hinge base 733 respectively on two sides corresponding to the first baffle 81 and the second baffle 82, the first baffle 81 is provided with a third hinge base 811 at a position close to the movable piece 73, the second baffle 82 is provided with a fourth hinge base 821 at a position close to the movable piece 73, the third hinge base 811 is located above the first hinge base 732, the fourth hinge base 821 is located above the second hinge base 733, one end of the first connecting rod 74 is arranged on the first hinge base 732 in a hinge manner and the other end of the first connecting rod 74 is arranged on the third hinge base 811 in a hinge manner, and one end of the second connecting rod 75 is arranged on the second hinge base 733 in a hinge manner and the other end of the second connecting rod 75 is arranged on the fourth hinge base 821 in a hinge manner. Of course, the movable piece may move downward to simultaneously drive the first baffle and the second baffle to swing upward so as to open the first opening and the second opening; and the movable piece may move upward to simultaneously drive the first baffle and the second baffle to swing downward so as to close the first opening and the second opening.

In this embodiment, the cross beam 61 is provided with a movable cavity 64 for the movable piece 73 to move, a guide groove 65 is formed in a side wall of the movable cavity 64 along a vertical direction, and the movable piece 73 is provided with a guide block 734 in a sliding fit with the guide groove 65.

In this embodiment, a driving gear 76 is arranged on an output shaft of the motor device 71, the drive gear 72 is rotatably arranged on the mosquito blocking base 6 through a rotating shaft 77, a first transmission gear 78 engaged with the driving gear 76 is rotatably arranged on the rotating shaft 77, the mosquito blocking base 6 is provided with a second transmission gear 79 engaged with the first transmission gear 78 beside the first transmission gear 78, and the second transmission gear 79 is engaged with the drive gear 72.

In this embodiment, the upper shell 1 includes a middle frame 11 and an upper cover 12, wherein the upper cover 12 covers the middle frame 11 and is fixedly connected to the middle frame 11 through a screw, the middle frame 11 and the fan frame 2 are fixedly connected through a screw, an air inlet 112 is formed in an outer side surface of the middle frame 11, a mosquito inlet cavity 111 is formed in the middle frame 11, a light guide sleeve 52 is fixedly arranged on the upper cover 12, the light guide sleeve 52 extends into the mosquito inlet cavity 111, the mosquito-luring lamp 51 is arranged on an end part of the light guide sleeve 52, a circuit board 101, a battery 102, a mosquito-killing switch 103 and a lamp switch 104 are arranged on the upper cover 12, the motor device 71, the battery 102, the fan 4, the mosquito-luring lamp 51, the mosquito-killing switch 103 and the lamp switch 104 are electrically connected to the circuit board 101 respectively, a tube 121 is fixedly arranged on the upper cover 12, the tube 121 conducts the upper cover 12 and the mounting cavity 21, and the fan frame 2 is provided with a USB charging head 105.

In this embodiment, an annular mosquito-preventing net 106 is fixedly connected below the mosquito blocking base 6, a clamping block 66 is arranged on the mosquito blocking base 6, a clamping groove 32 is formed in the lower shell 3, the clamping block 66 is clamped in the clamping groove 32 to realize fixed connection of the mosquito blocking base 6 and the lower shell 3, a periphery of the annular mosquito-preventing net 106 is surrounded by a side wall of the lower shell 3, and the air outlet includes a first air outlet 331 formed in the side wall of the lower shell 3 and a second air outlet 332 formed on a bottom surface of the lower shell 3.

The above embodiments are only preferred specific embodiments of the utility model, and usual changes and substitutions made by those skilled in the art within the scope of the technical solution of the utility model should be included in the protection scope of the utility model.

What is claimed is:

1. A mosquito-killing lamp, comprising a shell, wherein the shell comprises an upper shell, a fan frame and a lower shell which are arranged sequentially from top to bottom, the upper shell and the lower shell are connected through the fan frame, the upper shell is provided with a mosquito inlet cavity, the lower shell is provided with a mosquito storage cavity, the fan frame is internally provided with a mounting cavity for communicating the mosquito inlet cavity and the mosquito storage cavity, a fan is mounted at the mounting cavity, the upper shell is provided with an air inlet for mosquitoes to fly into the mosquito inlet cavity, the lower shell is provided with an air outlet communicating with the mosquito storage cavity, the air inlet, the mosquito inlet cavity, the mounting cavity, the mosquito storage cavity and the air outlet form a complete wind path, the shell is internally provided with a mosquito-luring lamp, a mosquito blocking base is clamped between the fan frame and the lower shell, the mosquito blocking base is provided with an opening for conducting the mounting cavity and the mosquito storage cavity, the mosquito blocking base is provided with a baffle capable of opening or closing the opening in a hinge manner, a driving mechanism for driving the baffle to swing is arranged on the mosquito blocking base, the driving mechanism comprises a motor device, a drive gear, a connecting rod and a movable piece, the motor device is fixedly arranged on the mosquito blocking base, the drive gear is rotatably arranged on the mosquito blocking base, the movable piece is slidingly arranged on the mosquito blocking base along a vertical direction, the movable piece is provided with a rack occluded with the drive gear in a linkage manner along the vertical direction, one end of the connecting rod is arranged on the movable piece in a hinge manner and the other end of the connecting rod is arranged on the baffle in a hinge manner, an output shaft of the motor device drives the drive gear to rotate, the drive gear drives the movable piece to move up and down, and the movable piece drives the baffle to swing through the connecting rod.

2. The mosquito-killing lamp according to claim 1, wherein a cross beam is arranged in a middle of the mosquito blocking base, the motor device, the drive gear and the movable piece are arranged on the cross beam, the opening comprises a first opening and a second opening which are located on two sides of the cross beam, the baffle is provided with a first baffle and a second baffle respectively at positions corresponding to the first opening and the second opening, the first baffle and the second baffle are arranged on the cross beam respectively in a hinge manner, and the movable piece moves to simultaneously drive the first baffle and the second baffle to swing.

3. The mosquito-killing lamp according to claim 2, wherein the connecting rod comprises a first connecting rod and a second connecting rod, the movable piece is provided with a first hinge base and a second hinge base respectively on two sides corresponding to the first baffle and the second baffle, the first baffle is provided with a third hinge base at a position close to the movable piece, the second baffle is provided with a fourth hinge base at a position close to the movable piece, the third hinge base is located above the first hinge base, the fourth hinge base is located above the second hinge base, one end of the first connecting rod is arranged on the first hinge base in a hinge manner and the other end of the first connecting rod is arranged on the third hinge base in a hinge manner, and one end of the second connecting rod is arranged on the second hinge base in a hinge manner and the other end of the second connecting rod is arranged on the fourth hinge base in a hinge manner.

4. The mosquito-killing lamp according to claim 2, wherein the cross beam is provided with a movable cavity for the movable piece to move, a guide groove is formed in a side wall of the movable cavity along the vertical direction, and the movable piece is provided with a guide block in a sliding fit with the guide groove.

5. The mosquito-killing lamp according to claim 2, wherein a driving gear is arranged on the output shaft of the motor device, the drive gear is rotatably arranged on the mosquito blocking base through a rotating shaft, a first transmission gear engaged with the driving gear is rotatably arranged on the rotating shaft, the mosquito blocking base is provided with a second transmission gear engaged with the first transmission gear beside the first transmission gear, and the second transmission gear is engaged with the drive gear.

6. The mosquito-killing lamp according to claim 2, wherein the upper shell comprises a middle frame and an upper cover, the upper cover covers the middle frame and is fixedly connected to the middle frame, the middle frame is fixedly connected to the fan frame, the air inlet is formed in an outer side surface of the middle frame, the mosquito inlet cavity is formed in the middle frame, a light guide sleeve is fixedly arranged on the upper cover, the guide sleeve extends into the mosquito inlet cavity, the mosquito-luring lamp is arranged on an end part of the light guide sleeve, a circuit board, a battery and a button switch are arranged on the upper cover, the motor device, the battery, the fan, the mosquito-luring lamp and the button switch are connected to the circuit board respectively, a tube is fixedly arranged on the upper cover, and the tube conducts the upper cover and the mounting cavity.

7. The mosquito-killing lamp according to claim 2, wherein an annular mosquito-preventing net is fixedly connected below the mosquito blocking base, the lower shell is in a clamping fit with the mosquito blocking base, a periphery of the annular mosquito-preventing net is surrounded by a side wall of the lower shell, and the air outlet comprises a first air outlet formed in the side wall of the lower shell and a second air outlet formed in a bottom surface of the lower shell.

8. The mosquito-killing lamp according to claim 3, wherein the cross beam is provided with a movable cavity for the movable piece to move, a guide groove is formed in a side wall of the movable cavity along the vertical direction, and the movable piece is provided with a guide block in a sliding fit with the guide groove.

9. The mosquito-killing lamp according to claim 3, wherein a driving gear is arranged on the output shaft of the motor device, the drive gear is rotatably arranged on the mosquito blocking base through a rotating shaft, a first transmission gear engaged with the driving gear is rotatably arranged on the rotating shaft, the mosquito blocking base is provided with a second transmission gear engaged with the first transmission gear beside the first transmission gear, and the second transmission gear is engaged with the drive gear.

10. The mosquito-killing lamp according to claim 3, wherein the upper shell comprises a middle frame and an upper cover, the upper cover covers the middle frame and is fixedly connected to the middle frame, the middle frame is fixedly connected to the fan frame, the air inlet is formed in an outer side surface of the middle frame, the mosquito inlet cavity is formed in the middle frame, a light guide sleeve is fixedly arranged on the upper cover, the guide sleeve extends into the mosquito inlet cavity, the mosquito-luring lamp is arranged on an end part of the light guide sleeve, a circuit board, a battery and a button switch are arranged on the upper cover, the motor device, the battery, the fan, the mosquito-luring lamp and the button switch are connected to the circuit board respectively, a tube is fixedly arranged on the upper cover, and the tube conducts the upper cover and the mounting cavity.

11. The mosquito-killing lamp according to claim 3, wherein an annular mosquito-preventing net is fixedly connected below the mosquito blocking base, the lower shell is in a clamping fit with the mosquito blocking base, a periphery of the annular mosquito-preventing net is surrounded by a side wall of the lower shell, and the air outlet comprises a first air outlet formed in the side wall of the lower shell and a second air outlet formed in a bottom surface of the lower shell.

12. The mosquito-killing lamp according to claim 1, wherein a driving gear is arranged on the output shaft of the motor device, the drive gear is rotatably arranged on the mosquito blocking base through a rotating shaft, a first transmission gear engaged with the driving gear is rotatably arranged on the rotating shaft, the mosquito blocking base is provided with a second transmission gear engaged with the first transmission gear beside the first transmission gear, and the second transmission gear is engaged with the drive gear.

13. The mosquito-killing lamp according to claim 1, wherein the upper shell comprises a middle frame and an upper cover, the upper cover covers the middle frame and is fixedly connected to the middle frame, the middle frame is fixedly connected to the fan frame, the air inlet is formed in an outer side surface of the middle frame, the mosquito inlet cavity is formed in the middle frame, a light guide sleeve is fixedly arranged on the upper cover, the guide sleeve extends into the mosquito inlet cavity, the mosquito-luring lamp is arranged on an end part of the light guide sleeve, a circuit board, a battery and a button switch are arranged on the upper cover, the motor device, the battery, the fan, the mosquito-luring lamp and the button switch are connected to the circuit board respectively, a tube is fixedly arranged on the upper cover, and the tube conducts the upper cover and the mounting cavity.

14. The mosquito-killing lamp according to claim 1, wherein an annular mosquito-preventing net is fixedly connected below the mosquito blocking base, the lower shell is in a clamping fit with the mosquito blocking base, a periphery of the annular mosquito-preventing net is surrounded by a side wall of the lower shell, and the air outlet comprises a first air outlet formed in the side wall of the lower shell and a second air outlet formed in a bottom surface of the lower shell.

* * * * *